United States Patent
Cao et al.

(10) Patent No.: US 8,533,346 B2
(45) Date of Patent: Sep. 10, 2013

(54) SIP-BASED NETWORK VIDEO SURVEILLANCE SYSTEM AND METHOD

(75) Inventors: Ning Cao, Shanghai (CN); Ming Feng, Beijing (CN); Duguo Liang, Shanghai (CN); Yanxia Zhang, Shanghai (CN); Zemin Zheng, Shanghai (CN)

(73) Assignee: China Telecom Corporation Limited, China ( * ) Notice: Subject to any disclaimer, the term of this patent is extended or adjusted under 35 U.S.C. 154(b) by 331 days.

(21) Appl. No.: 12/884,477

(22) Filed: Sep. 17, 2010

(65) Prior Publication Data
US 2011/0141280 A1 Jun. 16, 2011

(30) Foreign Application Priority Data

Dec. 14, 2009 (CN) .......................... 2009 1 0258134

(51) Int. Cl.
*G06F 15/16* (2006.01)
*H04N 7/18* (2006.01)

(52) U.S. Cl.
USPC ......................................... 709/228; 348/143

(58) Field of Classification Search
USPC ......................................... 709/228; 348/143
See application file for complete search history.

(56) References Cited

U.S. PATENT DOCUMENTS

| | | | |
|---|---|---|---|
| 7,969,956 B2 * | 6/2011 | Borella et al. | 370/342 |
| 2004/0086093 A1 * | 5/2004 | Schranz | 379/37 |
| 2004/0125757 A1 * | 7/2004 | Mela et al. | 370/261 |
| 2006/0155851 A1 * | 7/2006 | Ma et al. | 709/226 |
| 2008/0158336 A1 * | 7/2008 | Benson et al. | 348/14.08 |
| 2008/0235511 A1 * | 9/2008 | O'Brien et al. | 713/171 |
| 2009/0055473 A1 * | 2/2009 | Synnergren | 709/204 |
| 2009/0132717 A1 * | 5/2009 | Maes | 709/228 |

\* cited by examiner

*Primary Examiner* — Lynn Feild
*Assistant Examiner* — Lin Liu
(74) *Attorney, Agent, or Firm* — Cantor Colburn LLP

(57) ABSTRACT

The present invention provides a SIP-based network video surveillance system and method, which relates to the application field of network video surveillance. The network video surveillance method comprises the steps of: receiving a request message from a client by a call control server (CCS), the request message comprising an ID of a Premises Unit (PU) and a channel ID; forwarding the request message to a center management server (CMS) by the CCS for access authentication; transmitting the request message to the PU by the CCS after the request message passes the access authentication; responding by the PU an acknowledgement message containing video codec information to the CMS via the CCS; forwarding the acknowledgement message containing the video codec information and an access path to the client by the CMS, then establishing, by the client, a video stream connection with a network element directed by the access path on the basis of the acknowledge message. The present invention uses SIP in conjunction with other protocols to build a complete video surveillance architecture, improving the extensibility of a platform and makes the whole system more stable and reliable.

6 Claims, 6 Drawing Sheets

SIP-BASED NETWORK VIDEO SURVEILLANCE SYSTEM AND METHOD

FIELD OF THE INVENTION

The present invention relates to the application field of network video surveillance, in particular to a SIP (Session Initiation Protocol)-based network video surveillance system and method.

BACKGROUND OF THE TECHNOLOGY

Nowadays, there are various forms of network video surveillance systems, which basically solve the problem in the application of network video surveillance. However, when facing huge scale surveillance networks, since there is no international standard protocol specific to video surveillance, the expansibility of network video surveillance system is restricted.

SUMMARY OF THE INVENTION

The present invention aims to provide a network video surveillance method, which provides a technical basis for realizing a network video surveillance system by using a SIP protocol.

According to one aspect of the present invention, it is provided a SIP-based network video surveillance method, comprising: receiving a request message from a client by a Call Control Server (CCS), the request message comprising an ID of a Premises Unit (PU) and a channel ID; forwarding the request message to a Central Management Server (CMS) by the CCS to for access authentication; transmitting the request message to the PU by the CCS after the request message passes the access authentication; responding, by the PU, an acknowledgement message containing video codec information to the CMS via the CCS; forwarding the acknowledgement message containing the video codec information and an access path to the client by the CMS; and establishing, by the client, a video stream connection with a network element directed by the access path on the basis of the acknowledge message.

In one embodiment, the establishing, by the client, a video stream connection with a network element directed by the access path on the basis of the acknowledge message comprises: establishing a video stream connection between the client and the PU when the access path is directed to the PU directly; or, when the access path is directed to the PU via a Video Transfer and Dispatch Unit (VTDU), establishing video stream connections between the client and the VTDU and between the VTDU and the PU, respectively.

In one embodiment, the network video surveillance method further comprises: transmitting a session termination message to the PU by the client via the CMS when the client stops an access; and stopping transmitting a video stream by PU according to the session termination message.

In one embodiment, the network video surveillance method further comprises: connecting a client-end CMS and a video source-end CMS belonging to different domains via a Service Management Server (SMS); receiving and forwarding, by the SMS, a request message for cross-domain video browse as forwarded by the client-end CMS from the client; and the video source-end CMS interacting with the client-end CMS via the SMS to establish a video stream connection between the client initiating the request for the cross-domain video browse and a network element within the domain to which the video source-end CMS belongs.

In one embodiment, communication is performed between the client and the CCS, and between the PU and the CCS, and between the CCS and the CMS by means of a SIP protocol.

The present invention further aims to provide a network video surveillance system to improve the extensibility of a platform.

According to another aspect of the present invention, it is provided a SIP-based network video surveillance system, comprising: a client configured for transmitting a request for video information; a PU configured for acquiring and transferring the video information; a CCS configured for receiving a request message from the client, the request message including an ID of the PU and a channel ID; and a CMS configured for receiving the request message forwarded by the CCS and performing access authentication upon the request massage, the request message being transmitted to the PU by the CCS after the request message passes the access authentication, wherein the PU is further configured for responding an acknowledgement message containing video codec information to the CMS via the CCS, and the CMS is configured for forwarding the acknowledgement message containing the video codec information and an access path to the client, and the client is configured for establishing a video stream connection with a network element directed by the access path on the basis of the acknowledgement message.

In one embodiment, a video stream connection is established between the client and the PU when the access path is directed to the PU directly; or, when the access path is directed to the PU via a VTDU, video stream connections are established between the client and the VTDU and between the VTDU and the PU, respectively.

In one embodiment, the client is further configured for transmitting a session termination message to the PU via the CMS when the client stops an access, and the PU stops transmitting a video stream according to the session termination message.

In one embodiment, the network video surveillance system further comprises: a SMS configured for connecting a client-end CMS and a video source-end CMS belonging to different domains, receiving and forwarding a request message for cross-domain video browse as forwarded by the client-end CMS from the client, transmitting a message of interaction between the video source-end CMS and the client-end CMS, and establishing a video stream connection between the client initiating the request message for cross-domain video browse and a network element within the domain to which the video source-end CMS belongs.

In one embodiment, communication is performed between the client and the CCS, and between the PU and the CCS, and between the CCS and the CMS by means of a SIP protocol.

Based on the above technical solutions, the present invention realizes real-time video communication control signaling between equipments by means of a SIP protocol. Both the internal communication of a system platform and the external real-time video communication control between different platforms use a SIP protocol as core one, which not only realizes the unification of communication protocols to greatly improve the extensibility of a platform, but also makes the communication between different surveillance platforms easier, and the communication with other video service platforms using a SIP protocol is made easier, too. Moreover, because of the advantages of the SIP protocol itself, such as simplicity, convenience and applicability, etc, the whole system is made more stable and reliable.

BRIEF DESCRIPTION OF THE DRAWINGS

The drawings herein are for further explaining the present invention, and constitute a part of the present invention. The schematic embodiments and the explanations thereof in the present invention are only for explaining the invention, but do not serve as inappropriate limitation of the disclosure. Among the drawings.

SPECIFIC EMBODIMENTS OF THE PRESENT INVENTION

The following is a detailed description of the present invention with reference to the drawings, wherein the schematic embodiments of the invention are explained. In the drawings, the same reference sign indicates the same or similar component or element.

Figure 1:
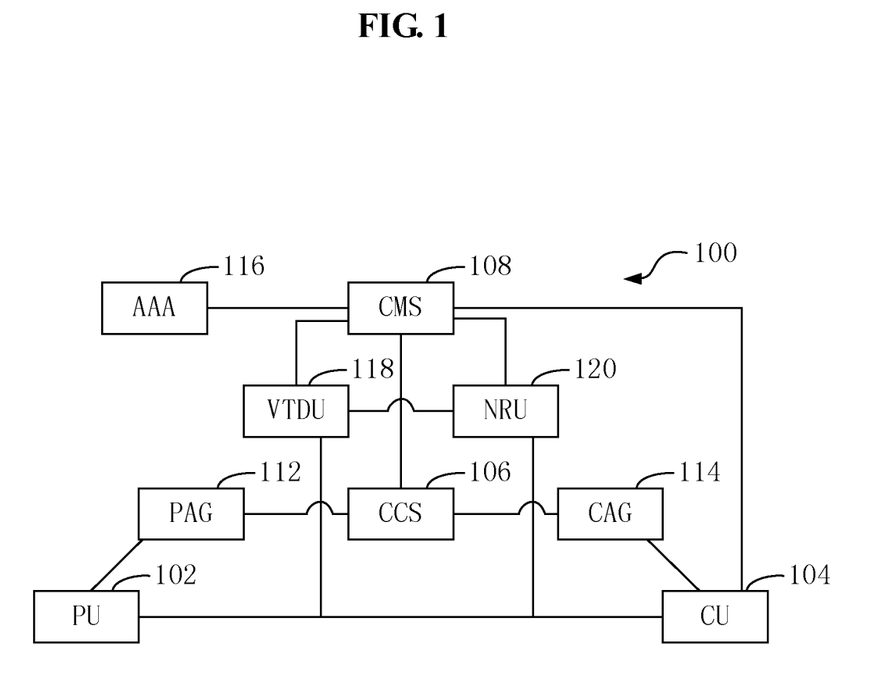
FIG. 1 is a schematic diagram of a single-domain structure of a SIP-based network video surveillance system according to an embodiment of the present invention.

FIG. 1 is a schematic diagram of a single-domain structure of a SIP-based network video surveillance system 100 according to an embodiment of the present invention. The network video surveillance system 100 comprises: a Premises Unit (PU) 102, a Client Unit (CU) or client 104, a Call Control Server (CCS) 106, a Central Management Server (CMS) 108, a PU Access Gateway (PAG) 112, a Client Access Gateway (CAG) 114, an Authentication center (AAA) 116, a Video Transfer and Dispatch Unit (VTDU) 118, and a Network Recording Unit (NRU) 120, which will be explained below in detail.

According to an embodiment of the present invention, the network video surveillance system 100 uses a SIP protocol as a unified call control protocol to perform unified authentication and authorization of users as well as call control and service triggering management, and realizes connection and communication between different video service networks and with other networks. As a signaling protocol for an IP network, the main function of SIP is to establish and manage calls, wherein the protocol for transmitting media data is RTP (Realtime Transport Protocol)/RTCP (Realtime Transport Control Protocol).

One or more CUs 104 may be used for sending a request for video information including an ID of a PU and various channel IDs such as video channel ID, audio channel ID etc. For example, the client logs in a video webpage, obtains a video list, and orders a desired video to obtain an ID of a PU and an ID of a video channel. The CU 104 presents video information, audio information, data information and alert information to the user. According to the different client types, some CUs 104 have the functions of managing the equipments and users of a system.

The CU 104 accesses the network video surveillance system 100 via a CAG 114. As a SIP server, the CAG 114 manages the access of the CU 104, receives and forwards a call control signaling from the CU 104 and/or a CCS 106, and is responsible for forwarding the signaling to the CCS 106 which belongs to same domain as that of the CU 104, for further processing. When the CU 104 is deployed behind NA(P)T/FW (Network (Port) Address Translation/FireWall), the function of the CAG 114 is the same as that of a PAG 112.

One or more PUs 102 may be used for acquiring and transmitting video information. The PU 102 has the function of acquiring video information, audio information, data information and alert information, and realizes bidirectional transmission of voice information and data information. Some PUs 102 can realize the function of storing video and audio recording.

The PU 102 accesses the network video surveillance system 100 via the PAG 112. As a SIP server, the PAG 112 manages the access of the PU 102, and receives and forwards a call control signaling from the PU 102 and the CCS 106. When the PU 102 is behind the NA(P)T/FW and if a VTDU 118 is not allowed to go through the firewall, a media stream can be forwarded via the PAG 112 which needs to forward a RTP stream received from the PU 102 and transmit a bidirectional RTCP stream to the PU 102. The PAG 112 also realizes the function of SBC (Server-based Computing) to realize signaling proxy and media proxy.

The CCS 106 is configured for receiving a request message from the CU 104, the request message including an ID of the PU 102 and a channel ID. The CCS 106 may provide a session control function, realize the reception, trigger and transfer of a SIP request, and realize a signaling access processing of the PU 102 and CU 104. The CCS 106 is a SIP server. Furthermore, the CCS 106 may serve as a registration server to receive a registration request from the PU 102 and the CU 104; as a SIP server, the CCS 106 may offer session control to the registered PU 102 and CU 104; as a SIP server, the CCS 106 may forward a SIP request of the CU 104 to the PAG 112 and forward a response of the PU 102 to the CAG 114; as a SIP server, the CCS 106 may interact with a service platform of a CMS 108.

The CMS 108 is configured for receiving a request message forwarded by the CCS 106, and performs access authentication upon the request message via an authentication center (AAA) 116. If the message passes the access authentication, the request message is transmitted to the PU 102 via the CCS 106.

In addition, the PU 102 is further configured for responding an acknowledgement message containing video codec information to the CMS 108 via the CCS 106. The CMS 108 may transfer the acknowledgement message containing the video codec information and an access path to the CU 104. The CU 104 may establish a video stream connection with a network element directed by the access path on the basis of the acknowledgement message.

The VTDU 118 is configured for transferring and distributing video and audio information.

In one embodiment, the PAG 112 and the CAG 114 can be implemented on the same equipment.

In one embodiment of the present invention, a NRU 120 is further included for recording video and audio information transferred by the VTDU 118.

Figure 2:
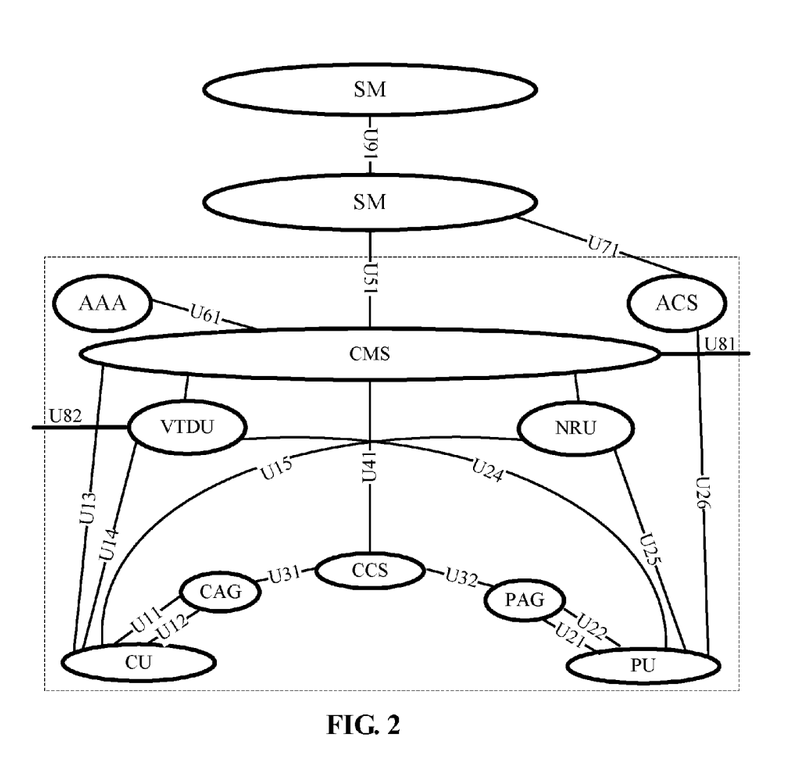
FIG. 2 is a schematic diagram of reference points of network elements in a SIP-based network video surveillance system according to an embodiment of the present invention.

FIG. 2 is a schematic diagram of reference points of network elements in a SIP-based network video surveillance system according to an embodiment of the present invention. Wherein a first kind of reference points is used to stand for an interface between a CU and a platform and comprises:

U11 and U31: call control interfaces, which adopts a SIP protocol;

U12: a video playback interface, which adopts a RTSP (Real Time Streaming Protocol) protocol;

U13: a management and service interface, which adopts HTTP (Hypertext Transfer Protocol)+XML (Extensible Markup Language);

U14: a media stream interface, which adopts a RTP (Real-time Transport Protocol)/RTCP (RTP Control Protocol);

U15: a media stream interface, which adopts a RTP/RTCP.

A second kind of reference points is used to stand for an interface between a PU and a platform and comprises:

U21 and U32: a call control interface, which adopts a SIP protocol; a management and service interface, which adopts SIP+XML;

U22: a video playback interface, which adopts RTSP, (this interface is only intended for PU recording);

U24: a media stream interface, which adopts a RTP/RTCP;

U25: a media stream interface, which adopts a RTP/RTCP;

U26: a PU equipment network management interface, which adopts TR069 to perform system parameter configuration.

A third kind of reference points is used to stand for a service control interface and comprises:

U41: a service control interface, which adopts SIP protocol; a management and service interface, which adopts SIP+XML.

A fourth kind of reference points is used to stand for a video playback interface between CAG/PAG and CCS, and a video playback interface between CCS and CMS.

A fifth kind of reference points is used to stand for an interface between CMS and AAA and comprises:

U61: an interface between CMS and AAA Server, which adopts a Radius protocol.

A sixth kind of reference points is used to stand for a cross-platform interconnecting interface and comprises:

U51: an interface between CMS and SM, wherein SOAP (Simple Object Access Protocol) is used for signaling, and a charging file is used for charging.

U71: an interface between SM and TR069 management servers, which adopts a SOAP;

U81: an inter-domain call control interface, which adopts SIP;

U82: an inter-domain media stream interface, which adopts RTP/RTCP;

U91: an inter-domain management and service interface, which adopts SOAP.

Figure 3:
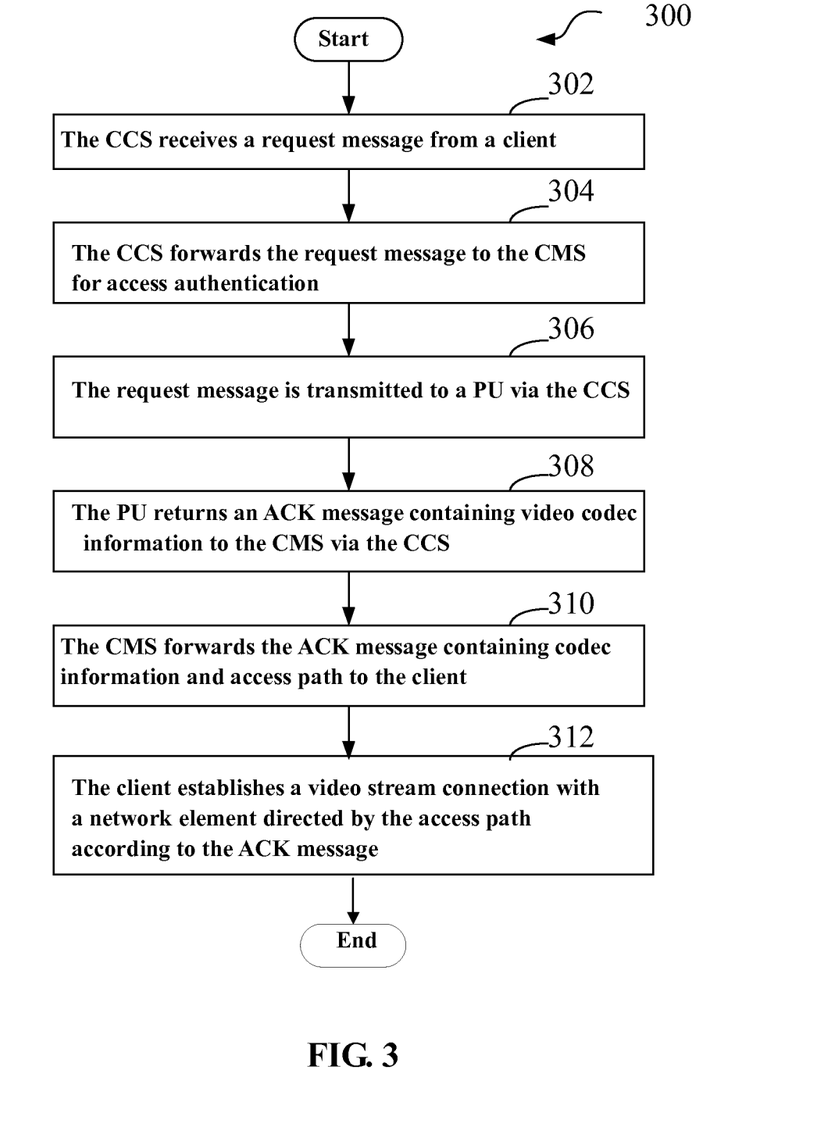
FIG. 3 is a flow chart of a network video surveillance method according to an embodiment of the present invention.

FIG. 3 is a flow chart of a network video surveillance method 300 according to an embodiment of the present invention.

At step 302, the CCS receives a request message including an ID of a PU and a channel ID from the client.

At step 304, the CCS forwards the request message to the CMS for access authentication.

At step 306, when the request message passes the access authentication, the CCS transmits the request message to the PU.

At step 308, the PU returns an acknowledgement message containing video codec information to the CMS via the CCS.

At step 310, the CMS forwards the acknowledgement message containing video codec information and an access path to the client.

At step 312, the client establishes a video stream connection with a network element directed by the access path according to the acknowledgement message.

Figure 4:
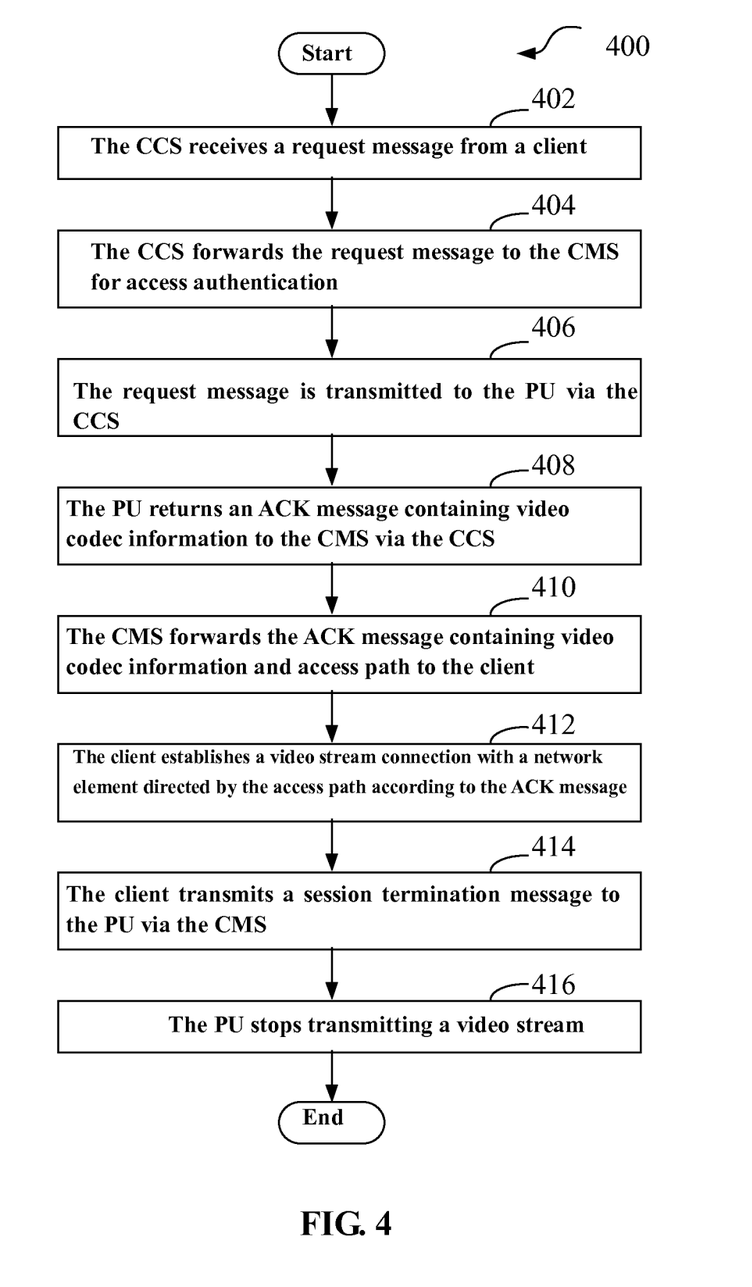
FIG. 4 is a flow chart of a network video surveillance method according to another embodiment of the present invention.

FIG. 4 is a flow chart of a network video surveillance method 400 according to another embodiment of the present invention.

At step 402, the CCS receives a request message from the client, the request message including an ID of the PU and a channel ID for identifying a video source to be accessed.

At step 404, the CCS forwards the request message to the CMS for access authentication. The CCS may forward the request message to the CMS to perform service control. And the CMS controls the access according to a preset strategy, such as determining whether there is an access privilege.

At step 406, after the request message passes the access authentication, the CCS sends the request message to the PU. After the access authentication is passed, the CMS transmits the request message to the CCS which interprets a user name recorded in the SIP URI of the field value of a route header, and determines the next hop. The CCS transmits the request message to the PU.

At step 408, the PU returns an acknowledgement (ACK) message containing video codec information to the CMS via the CCS. For example, the PU processes the request message, returns an acknowledgement message such as "200 OK", and provides a "SDP (Session Description Protocol) offer" which includes video codec information. The CCS transfers the "200 OK" ACK message carrying the SDP offer to the CMS.

At step 410, the CMS returns the acknowledgement message containing the video codec information and an access path to the client. For example, after the CMS receives "200 OK" message, the CMS selects the codec information and access path to be used, modifies the SDP, and forwards "200 OK" message to a CCS. Wherein the access path may be directed to the PU directly, and may also be directed to the PU via a VTDU. The CCS forwards the "200 OK" message to the client.

At step 412, the client establishes a video stream connection with a network element directed by the access path according to the acknowledgement message. After reserving resource for codec, the client attaches a "SDP answer" message as a reply in the acknowledgement (ACK) message. The CCS forwards the ACK message to the CMS. The CMS controls the VTDU to transfer a video stream according to the "SDP answer" in the ACK message and the "SDP offer" in the "200 OK" message from the PU. Moreover, the CMS modifies the SDP in the ACK message from the client, transfers the ACK message to the CCS and then forwards it to the PU. According to the access path, the client establishes a video stream connection with the PU; or video stream connection is established between the client and the VTDU and between the VTDU and the PU.

At step 414, when the client stops an access, the client transmits a session termination message to the PU via the CMS.

At step 416, the PU stops transmitting the video stream according to the session termination message, and responds "200 OK" message to the CCS and the CMS. The CCS transfers the "200 OK" message to the client and controls the VTDU to stop transferring the video stream.

Figure 5:
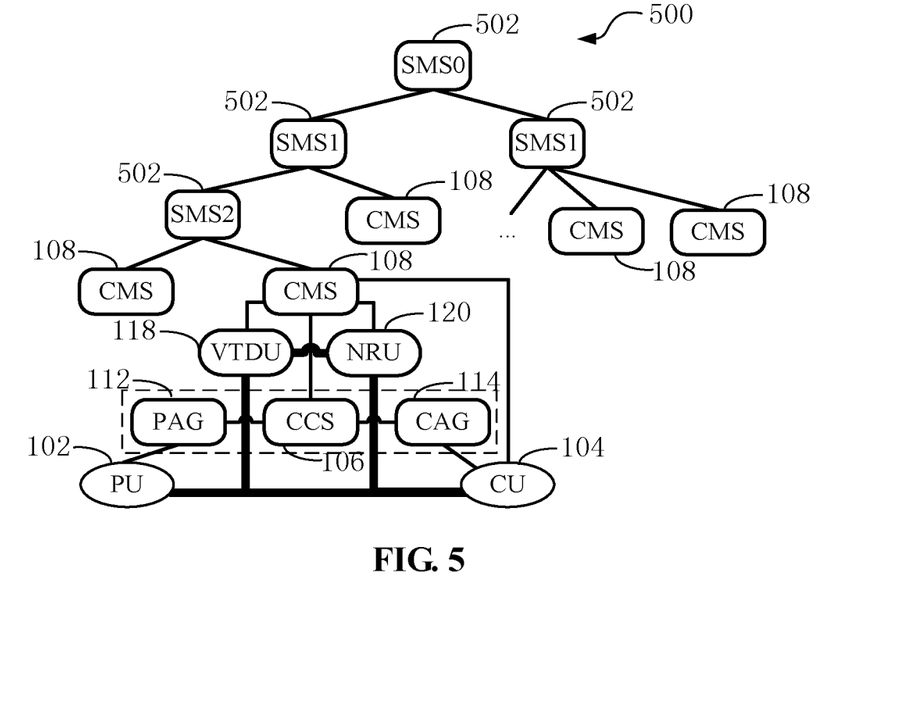
FIG. 5 is a schematic diagram of a multi-domain structure of a SIP-based network video surveillance system according to an embodiment of the present invention.

FIG. 5 is a schematic diagram of a multi-domain structure of a SIP-based network video surveillance system 500 according to an embodiment of the present invention. The system may comprise a plurality of management servers (SMSs) 502, such as SMS0, SMS1, SMS2 . . . . Each SMS is configured for connecting a client-end CMS and a video source-end CMS which belong to different domains, receiving and forwarding a request message for cross-domain video browse as forwarded by the client-end CMS from the client, transferring an interaction message between the video source-end CMS and the client-end CMS, and establishing a video stream connection between the client sending the request message for cross-domain video browse and a network element in the domain to which the video source-end CMS belongs.

The plurality of SMSs 502 may construct a plurality of single domains into a multi-domain interconnect structure. In the interconnecting system, the respective SMS 502 may perform functions such as service control, content distribution, service/operation support, routing query and charging, etc, upon respective administrated CMSs 108. The individual SMS 502 may not store information about equipments and users in a subordinate domain. When a client or equipment is added in or deleted from a BOSS (Business & Operation Support System), the SMS 502 may only transfer relevant information to the corresponding CMS 108 so as to be processed by the CMS 108. When a SMS 502 needs the relevant information, it sends a query to a CMS 108. As a service management layer, the SMS 502 may be deployed in multiple levels. The SMS 502 may provide functional service interfaces to a service support system of an operator, a user's self-managing system and other multimedia application support systems, provide services such as service data query and service setting.

The main functions and implementing requirements of the SMS 502 includes:

1) cross-domain service control: the SMS 502 supports a request of the CMS 108 when processing cross-domain video browse by performing service control. If the SMS 502 accepts the request, a signaling address of the domain to which the CMS 108 of the opposite party belongs is responded. If the request is rejected, the reason for the rejection is responded. The SMS 502 stores routing information or the like of the subordinate domain.

2) Service management: the SMS 502 supports the addition, deletion and modification of information of the functional clients and equipments interfacing with the BOSS, and supports the assignment of equipments to clients and setting a client's access privilege. The SMS 502 may also have a service operation support function to realize the function of BOSS when it fails to interface with the BOSS.

3) Content distribution: the SMS 502 may support the function of outward content distribution, mainly including video and audio content and relevant data content at the monitored place in the administrated domain. During content grouping, the SMS 502 needs to inherit all the distributed content groups owned by a upper-level SMS 502, and may create distributed content groups specific to the present domain it belongs to, and the same type of content resources in the administrated subordinate domains as that in the present domain is also to be distributed in the groups of the present domain. The SMS 502 may retrieve content from the CMS 108 and a subordinate SMS 502 according to the distributed content groups, and the subordinate SMS 502 or the CMS 108 may create all the distributed content groups of an upper-level SMS 502 even though they are empty. The SMS 502 receives, from the CMS 108, a video monitor capacity which is packaged in web service, the SMS 502 can also receive from other application servers the service capacity which is also packaged in web service, and then the SMS 502 can combine the video monitor capacity and the service capacity so as to be presented to the user as a whole by the same interface.

4) Charging: the SMS 502 may realize the function of obtaining charging information of the time length/traffic of the real-time/historical media access from the CMS 108 and the subordinate SM.

5) Capacity packaging: the SMS 502 may realize an opening capacity interface so as to provide a Web Service interface of the external capacity as provided by the present domain, and thus to offer its functions to other systems.

6) Management support: the SMS 502 may be registered in an upper-level SMS 502 so as to be managed and controlled by the upper-level SMS 502. The SMS 502 supports SNMP (Simple Network Management Protocol), is managed by a network management system, and realizes the functions of network management agent concerning configuration management, status and failure, etc. The SMS 502 may not be responsible for the routing implementation or signaling control of services, but the CMS 108 needs to retrieve necessary routing information and equipment-user ownership information from the SMS 502.

Figure 6:
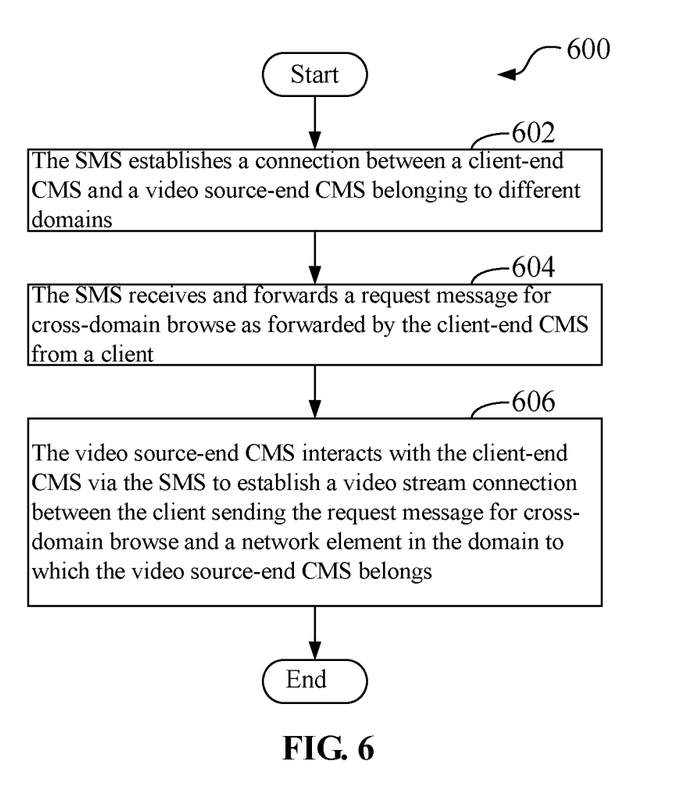
FIG. 6 is flow chart of a network video surveillance method according to another embodiment of the present invention.

FIG. 6 is flow chart of a network video surveillance method 600 according to another embodiment of the present invention.

At step 602, a client-end CMS and a video source-end CMS belonging to different domains are connected via a SMS.

At step 604, the SMS receives and forwards a request message for cross-domain browse as forwarded by the client-end CMS from a client.

At step 606, the video source-end CMS interacts with the client-end CMS via the SMS to establish a video stream connection between the client sending the request message for cross-domain video browse and a network element in the domain to which the video source-end CMS belongs. For example, after receiving the "200 OK" message carrying a PU SDP offer, the video source-end CCS may forward the "200 OK" message carrying a PU SDP offer to the video source-end CMS. The CMS selects a video source-end VTDU which reserves resources for selected codec. And then the video source-end CMS responds a "200 OK" message carrying a video source-end VTDU SDP offer to the video source-end CCS. The video source-end CCS forwards the "200 OK" message carrying the video source-end VTDU SDP offer to the source CCS. And then the client-end CCS forwards the "200 OK" message to the client-end CMS. The client-end CMS selects a client-end VTDU which reserves resources for the codec. And then the client-end CMS responds a "200 OK" message carrying a client-end VTDU SDP offer to the client-end CCS. After the client-end CCS forwards a "200 OK" message to the CU, the CU reserves resources for codec to establish respective media channels between CU and CAG, between CAG and client-end VTDU, between client-end VTDU and video source-end VTDU, between video source-end VTDU and PAG, and between PAG and PU, respectively.

The present invention realizes real-time video communication control signaling between equipments by means of a SIP protocol. Both the internal communication of a system platform and the external communication between different platforms center on a SIP protocol as a core of real-time video communication, which not only realizes the unification of communication protocols to greatly improve the extensibility of a platform, but also makes the communication between different platforms easier. Moreover, because of the advantages of the SIP protocol itself, such as simplicity, convenience and applicability, etc, the whole system is made more stable and reliable.

The description of the present invention is exemplary and descriptive, rather than exhaustive, and does not aim to limit on the disclosure of the invention. Many modifications and variations are obvious for those skilled in the art. The purpose of selecting and describing the embodiments is to better explain the principle and practical application of the invention and enable those skilled in the art to understand the present invention so as to design implementing forms with various modifications suitable for specific purposes.

What is claimed is:

1. A Session Initiation Protocol (SIP)-based network video surveillance method, comprising:
   receiving a request message from a client by a call control server (CCS), the request message comprising an ID of a Premises unit (PU) and a channel ID;
   forwarding the request message to a central management server (CMS) by the CCS for access authentication;
   transmitting the request message to the PU by the CCS after the request message passes the access authentication;
   responding, by the PU, an acknowledgement message containing video codec information to the CMS via the CCS;
   forwarding the acknowledgement message containing the video codec information and an access path to the client by the CMS; and
   establishing, by the client, a video stream connection with a network element directed by the access path on the basis of the acknowledge message, wherein, when the access path is directed to the PU via a Video Transfer and Dispatch Unit (VTDU), video stream connections are established between the client and the VTDU and between the VTDU and the PU, respectively;
   connecting a client-end CMS and a video source-end CMS belonging to different domains via a Service Management Server (SMS);
   receiving and forwarding, by the SMS, a request message for cross-domain video browse as forwarded by the client-end CMS from the client; and
   the video source-end CMS interacting with the client-end CMS via the SMS to establish a video stream connection between the client initiating the request for the cross-domain video browse and a network element within the domain to which the video source-end CMS belongs.

2. The network video surveillance method according to claim 1, further comprising:
   transmitting a session termination message to the PU by the client via the CMS when the client stops an access; and
   stopping transmitting a video stream by PU according to the session termination message.

3. The network video surveillance method according to claim 1, wherein communication is performed between the client and the CCS, and between the PU and the CCS, and between the CCS and the CMS by means of a SIP protocol.

4. A Session Initiation Protocol (SIP)-based network video surveillance system, comprising:
   a client configured for transmitting a request for video information;
   a PU configured for acquiring and transferring the video information;
   a CCS configured for receiving a request message from the client, the request message including an ID of the PU and a channel ID; and
   a CMS configured for receiving the request message forwarded by the CCS and performing access authentication upon the request massage, the request message being transmitted to the PU by the CCS after the request message passes the access authentication;
   wherein the PU is further configured for responding an acknowledgement message containing video codec information to the CMS via the CCS, and the CMS is configured for forwarding the acknowledgement message containing the video codec information and an access path to the client, and the client is configured for establishing a video stream connection with a network element directed by the access path on the basis of the acknowledgement message, wherein, when the access path is directed to the PU via a Video Transfer and Dispatch Unit (VTDU), video stream connections are established between the client and the VTDU and between the VTDU and the PU, respectively;
   a SMS configured for
      connecting a client-end CMS and a video source-end CMS belonging to different domains,
      receiving and forwarding a request message for cross-domain video browse as forwarded by the client-end CMS from the client,
      transmitting a message of interaction between the video source-end CMS and the client-end CMS, and
      establishing a video stream connection between the client initiating the request message for cross-domain video browse and a network element within the domain to which the video source-end CMS belongs.

5. The network video surveillance system according to claim 4, wherein the client is further configured for transmitting a session termination message to the PU via the CMS when the client stops an access, and the PU stops transmitting a video stream according to the session termination message.

6. The network video surveillance system according to claim 4, wherein communication is performed between the client and the CCS, and between the PU and the CCS, and between the CCS and the CMS by means of a SIP protocol.

* * * * *